(12) United States Patent
Schneider et al.

(10) Patent No.: US 9,630,721 B2
(45) Date of Patent: Apr. 25, 2017

(54) AIR TRANSMISSION SYSTEM FOR FLEXIBLE PASSENGER SUPPLY UNITS

(71) Applicant: Airbus Operations GmbH, Hamburg (DE)

(72) Inventors: Uwe Schneider, Jork Koenigreich Jork (DE); Witaliy Kotnow, Hamburg (DE); Gordon Konieczny, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 714 days.

(21) Appl. No.: 14/010,756

(22) Filed: Aug. 27, 2013

(65) Prior Publication Data
US 2014/0065937 A1 Mar. 6, 2014

Related U.S. Application Data

(60) Provisional application No. 61/695,330, filed on Aug. 31, 2012.

(30) Foreign Application Priority Data

Aug. 31, 2012 (DE) .................... 10 2012 017 349

(51) Int. Cl.
*B64D 13/02* (2006.01)
*B64D 13/00* (2006.01)
*B64D 13/06* (2006.01)

(52) U.S. Cl.
CPC ............. *B64D 13/02* (2013.01); *B64D 13/00* (2013.01); *B64D 2013/0625* (2013.01)

(58) Field of Classification Search
CPC .................... B64D 13/02; B64D 13/04; B64D 2700/62035; B64D 13/00;

(Continued)

(56) References Cited

U.S. PATENT DOCUMENTS 5,556,332 A * 9/1996 Schumacher .......... B64D 11/00
454/64
2008/0315043 A1* 12/2008 Baumann ............... B64D 13/02
244/53 B (Continued)

FOREIGN PATENT DOCUMENTS

DE 102010012882 B3 7/2011

OTHER PUBLICATIONS

Definition of Valve, Oxford English Dictionary, http://www.oed.com/search?searchType=dictionary&q=valve&_searchBtn=Search, accessed Oct. 3, 2016.*

(Continued)

*Primary Examiner* — Gregory Huson
*Assistant Examiner* — Dana Tighe
(74) *Attorney, Agent, or Firm* — Lorenz & Kopf, LLC

(57) ABSTRACT

A system for supplying passengers with air comprises an air supply line and an individual air panel with at least one air nozzle. The air supply line can be fitted with a plurality of laterally situated air outlets, which are spaced apart at uniform distances from each other. The individual air panel comprises an air tap opening with a width and length, wherein the length is several times greater than the width. The individual air panel can be variably positioned in the longitudinal direction on the air supply line in such a way that the air tap opening in the longitudinal direction is arranged parallel to the air supply line, and that the air tap opening covers at least one air outlet. In this way, air can flow out of the air supply line through the air outlet and air tap opening to the air nozzle.

14 Claims, 6 Drawing Sheets

(58) Field of Classification Search
CPC ...... B64D 2013/003; B64D 2013/0625; G05D 16/18; G05D 16/163
USPC ........................................ 454/72, 73, 71, 74
See application file for complete search history.

(56) References Cited

U.S. PATENT DOCUMENTS

| | | | |
|---|---|---|---|
| 2009/0275277 A1* | 11/2009 | Al-Alusi ............ | B60H 1/00371 |
| | | | 454/76 |
| 2010/0087130 A1 | 4/2010 | Nitsche et al. | |
| 2010/0116939 A1 | 5/2010 | Le Louarn et al. | |
| 2011/0284689 A1* | 11/2011 | Thomas ................. | B64C 1/066 |
| | | | 244/1 N |
| 2012/0012707 A1* | 1/2012 | Schliwa ............... | B64D 11/003 |
| | | | 244/118.5 |
| 2012/0129438 A1 | 5/2012 | Grosse-Plankermann et al. | |
| 2013/0005231 A1 | 1/2013 | Schneider et al. | |
| 2013/0105638 A1 | 5/2013 | Umlauft et al. | |

OTHER PUBLICATIONS

German Searching Authority, German Search Report for 10 2012 017 349.0 Dated Jul. 19, 2013.

* cited by examiner

AIR TRANSMISSION SYSTEM FOR FLEXIBLE PASSENGER SUPPLY UNITS

CROSS-REFERENCE TO RELATED APPLICATIONS

This application claims priority to German Patent Application No. 10 2012 017 349.0, filed Aug. 31, 2012 and to U.S. Provisional Patent Application No. 61/695,330, filed Aug. 31, 2012, which are each incorporated herein by reference in their entirety.

TECHNICAL FIELD

This application pertains to an air supply system for passengers in a passenger compartment, for example of an aircraft. In particular, the technical field relates to a system for transmitting air in passenger supply units (PSU), which can be flexibly arranged relative to a central air supply line.

BACKGROUND

DE 10 2010 012 882 B3 shows a system for supplying individual air with an air line and a sliding individual air panel. The air line has a tubular element with a slotted opening formed in the longitudinal direction, and a lamellar element, which is suitable for closing the slotted opening. The individual air panel has a housing, an air nozzle for controlling individual air on the front side of the housing, and a cantilever arm on the rear side of the housing for displacing the lamellar element, and thereby partially opening the air line, as well as an opening for receiving air from the air line.

Described in DE 10 2007 014 406 B3 is a supply channel with an air distribution system that comprises an oblong housing, a hollow profile extending in the longitudinal direction of the housing, and at least one air shower with an air inlet and at least one air outlet. A plurality of perforation openings is incorporated in a jacket surface of the hollow profile. The air shower is designed in such a way as to abut tightly against the jacket surface of the hollow profile in one area of the air inlet. Perforation openings emptying into an air inlet of an air shower can be sealed by means of an adhesive film applied thereto. The supply channel makes it possible to variably position air showers along the longitudinal direction of the supply channel.

However, the problem in such air distribution systems is that the air showers or air nozzles must be adjusted to the respective seat positions, which significantly hampers installation in the cabin equipment and retrofitting. This greatly limits the flexibility of the cabin configuration, since the aircraft reference documentation and connecting points must be determined very early on in the definition process.

Other objects, desirable features and characteristics will become apparent from the subsequent summary and detailed description, and the appended claims, taken in conjunction with the accompanying drawings and this background.

SUMMARY

According to various exemplary embodiments, provided is an air supply system that can be easily adjusted to a modified seat layout.

In general, an air supply system for passengers comprises an air supply line and an individual air panel with at least one air nozzle. The air supply line can be fitted with a plurality of laterally situated air outlets, which are spaced apart at uniform distances from each other. The individual air panel comprises an air tap opening with a width and length, wherein the length is several times greater than the width. According to various teachings of the present disclosure, the individual air panel can be variably positioned in the longitudinal direction on the air supply line in such a way that the air tap opening in the longitudinal direction is arranged parallel to the air supply line, and that the air tap opening covers at least one air outlet. In this way, air can flow out of the air supply line through the air outlet and air tap opening to the air nozzle.

If the position of the individual air panel is changed in the longitudinal direction, the air flows out of the air outlet only at one other location in the longitudinal air tap opening. If the individual air panel is shifted beyond the length of the air tap opening, the latter can already come to cover the next air outlet.

The air supply system enables a distribution of individual air panels without having to specially adjust the individual air supply. A flexible interface between the individual air panels and aircraft air supply system or climate control system permits an individual air supply at any longitudinal coordinate of the aircraft cabin. An operator thus has the option of selecting any seat spacing configuration desired, without having to reposition the supply channel. Instead, he or she can simply shift the individual air panels or give them a staggered arrangement.

In one exemplary embodiment, each of the air outlets can incorporate a valve, and an actuating element for opening the valve can be arranged on the air tap opening of the individual air panel, wherein the actuating element can be designed in such a way as to open the valve when the individual air panel is positioned on the air supply line.

For example, the valve can be a check valve, which can be situated in an air outlet in such a way that the check valve plunger is outwardly directed. For example, the actuating element can be designed as a rib or bar, which is suitable for inwardly pressing the plunger, and thereby opening the check valve.

In one embodiment, the air supply system can further comprise an attachment rail, wherein the individual air panel can be secured to the attachment rail in such a way that it can be shifted along the air supply line. The actuating element can here be suitable for opening an air outlet if the air tap opening is pushed over the air outlet, i.e., when the actuating element interacts with an element, for example a check valve, which closes the air outlet.

In another exemplary embodiment of the air supply system, the distance between two air outlets is slightly greater than the length of the air tap opening. As a result of this constellation, the air tap opening always covers precisely one air outlet when continuously shifted along the supply line.

In one embodiment, the individual air panel can be positioned on the air supply line at one of several predetermined positions spaced apart at uniform distances from each other along the air supply line, wherein the positions are predetermined in such a way that the air tap opening always completely covers precisely one air outlet.

In another exemplary embodiment, the individual air panel can also comprise a reading light, a stewardess call button, a loudspeaker, a USB interface for transmitting information and/or energy, an oxygen mask, an oxygen generator and/or an optical display element, so that the individual air panel comprises additional functionalities of a passenger supply unit (PSU).

In one embodiment, the air supply system can also comprise an air treatment unit that provides air with a desired humidity and temperature and/or filtered air, and routes it to the individual air panel through the air supply line.

In an exemplary embodiment, the aircraft comprises an air supply system as described herein for supplying passengers with individual inlet air. Let it here be noted that the air supply system can also be used in any means of passenger conveyance, for example in a bus, a railway car, or a ship.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
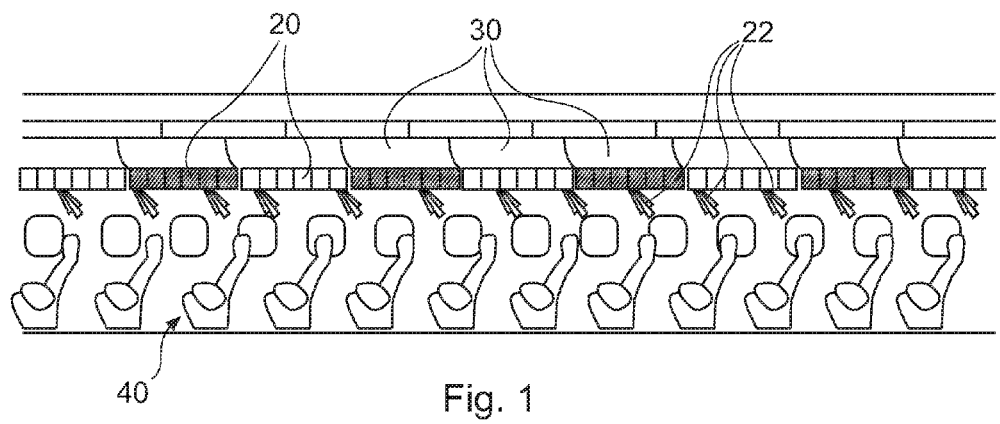
FIG. 1 is a longitudinal section through a passenger cabin.

FIG. 1 shows a longitudinal section through a passenger cabin of an aircraft. A plurality of seat rows 40 are arranged in the passenger cabin. Situated over the seat rows 40 are hat racks or storage compartments 30 along with passenger supply units 20 to supply the passengers with signals, information, electrical or electronic connections, as well as fresh air. As depicted on FIG. 1, air nozzles 22 allocated to each individual seat row are provided, and situated on a passenger supply channel spaced a corresponding distance apart from each other.

Figure 2:
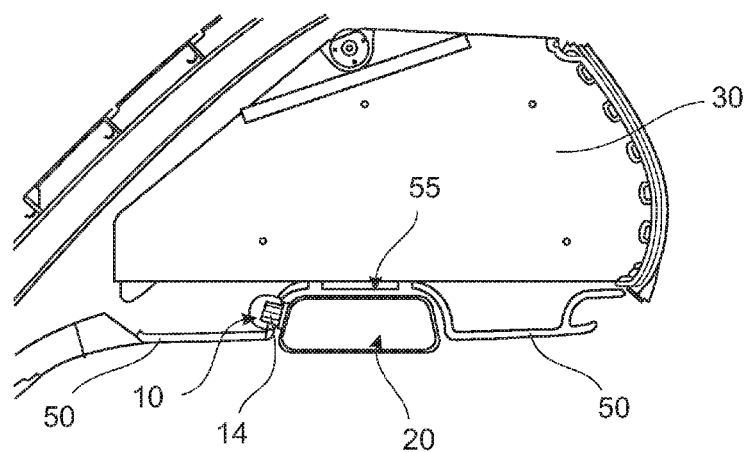
FIG. 2 is a cross section through a passenger supply channel under a storage compartment.

FIG. 2 is a cross section through a storage compartment 30, wherein cladding elements 50 are provided under the storage compartment 30. In roughly the middle under the storage compartment 30, the cladding elements 50 form a recess 55 suitable for accommodating at least one passenger supply unit (PSU) 20. An air supply line 10 is located on one side of the recess 55. The air supply line 10 has at least one valve 14, which is set up to regulate a flow of air from the air supply line 10 into the PSU 20.

Figure 3:
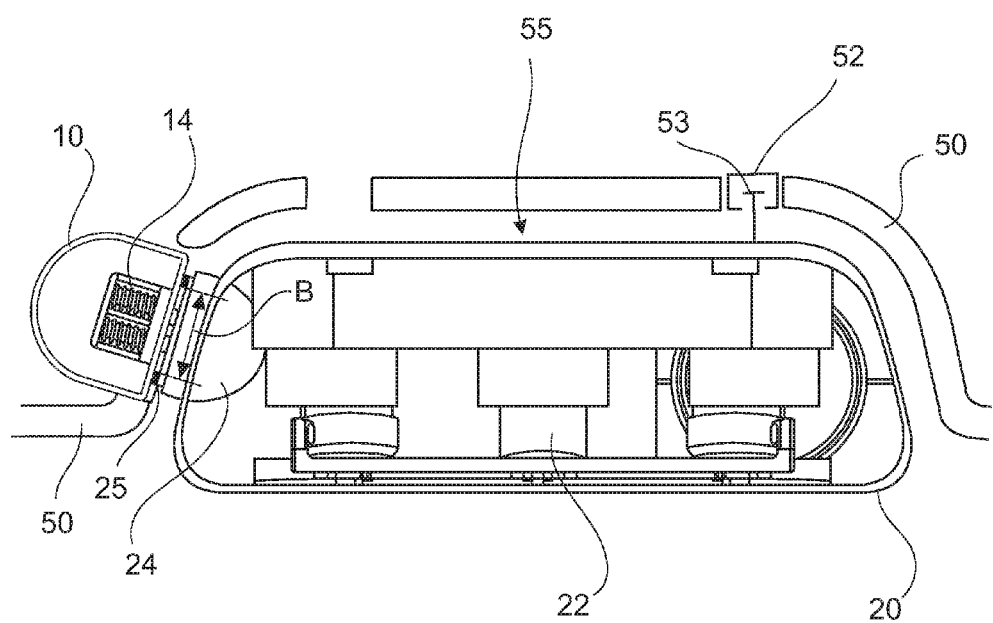
FIG. 3 is a cross section through an individual air panel and an air supply line.

FIG. 3 provides a detailed view of the arrangement of a PSU 20 in a recess 55. As shown on FIG. 3, the PSU 20 can comprise an air tap opening 24 on a side facing the air supply line, i.e., an element open toward the air supply line. As soon as a PSU 20 becomes situated in the recess 55, the valve 14 in the air supply line 10 can be actuated in such a way that air flows from the air supply line and through the air tap opening into the PSU 20. The inflowing air inside the PSU 20 can then be routed to air nozzles 22.

FIGS. 2 and 3 show gaps between the cladding elements 50 that form the recess 55. Rails 52 for suspending and shifting the PSU 20 can be provide in these gaps. Corresponding meshing elements 53 secured to the PSU 20 can engage into the rails 52.

Figure 4:
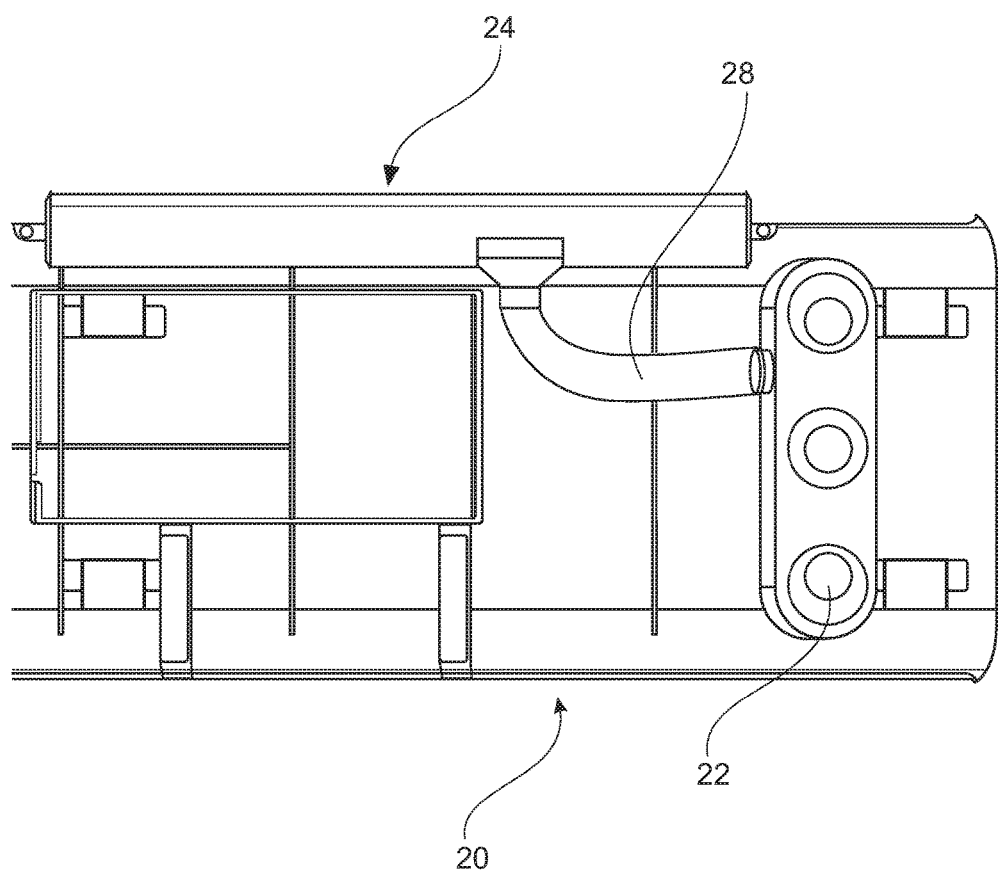
FIG. 4 shows an individual air panel according to one exemplary embodiment.

FIG. 4 presents one exemplary embodiment of a passenger supply unit (PSU) 20, wherein in particular the air supply arrangements are shown. The PSU 20 comprises an air tap opening 24, an air guiding element like a hose 28, as well as several air nozzles 22. The PSU 20 can further be set up to accommodate additional elements for supplying passengers with optical or acoustic signals or with energy.

Figure 5:
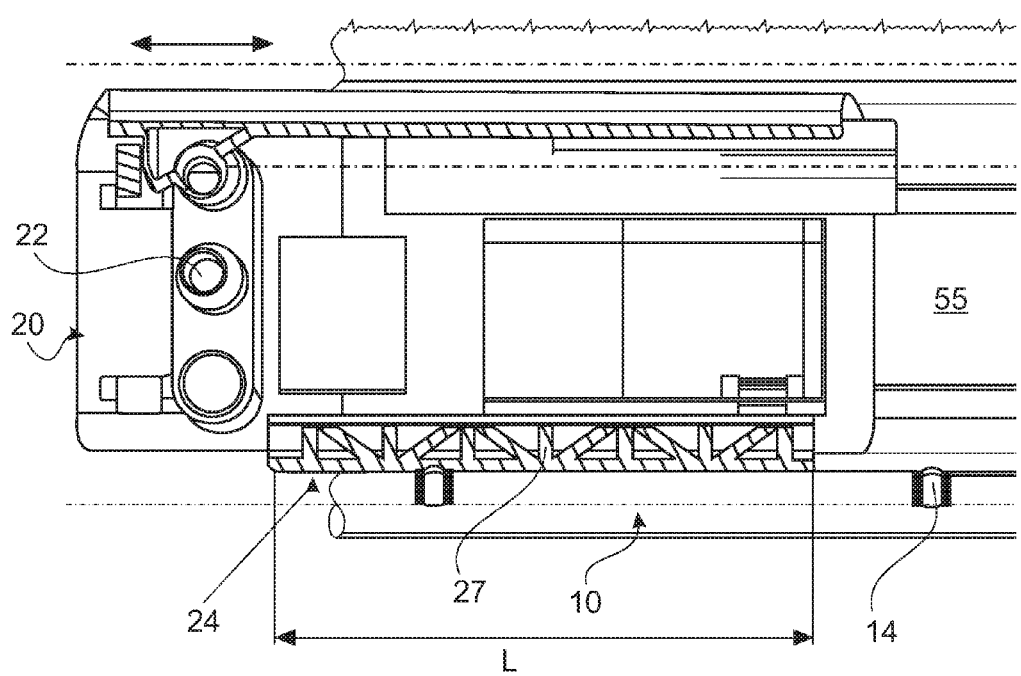
FIG. 5 shows an individual air panel according to another exemplart embodiment.

FIG. 5 presents an alternative embodiment of a PSU 20 with an air tap opening 224 and air nozzles 22. In this exemplary embodiment, the flow of air from the air tap opening 24 can be routed via integrally formed channels in the PSU housing to the air nozzles 22. It can here also be provided that additional functionalities be integrated into the PSU 20.

FIG. 5 further shows a section of a channel formed by the recess 55 in the cladding under a storage compartment. Situated on one side of the recess 55 parallel to the recess, which can be formed in the longitudinal direction of the passenger cabin, is an air supply line 10, which is provided at regular intervals with air outlets, wherein these air outlets are closed as regulated by valves 14.

Figure 6:
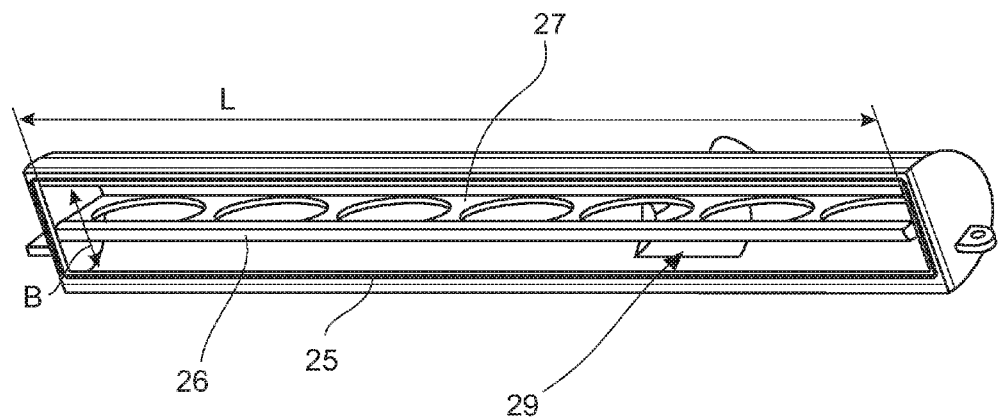
FIG. 6 is an isometric view of an air tap opening of an individual air panel.

FIG. 6 depicts an element for tapping air from the air supply line, i.e., an air tap opening. Such an element can be designed as a separate element or be an integral part of the housing of a PSU. As evident from FIG. 6, the element has an opening with length L and width B, wherein the length L is several times greater than width B. For example, the length L can be about 5 to about 9 times, in one example, about 7 times greater than the width B. For example, the length L can measure about 12 inches (30.5 cm), and the width B about 1.5 inches (3.8 cm). A rib 26 is situated in the opening in the longitudinal direction. The rib 26 is supported and reinforced by a plurality of braces 27. In the exemplary embodiment of FIG. 6, the rib 26 is substantially centrally located transverse to the longitudinal direction, and designed roughly flush with the outer edge of the opening. A rib 26 arranged in this way can be used to press a protruding end of a check valve plunger back far enough to open the check valve.

A seal 25 can be provided to prevent air from uncontrollably flowing past the air tap opening. As soon as the air tap opening is situated parallel to an air supply line in the longitudinal direction, and a check valve is opened by means of the rib 26, air can flow out of the air supply line into the air tap opening, and be relayed further through an outlet opening 29 in the direction of one or more air nozzles.

Figure 7:
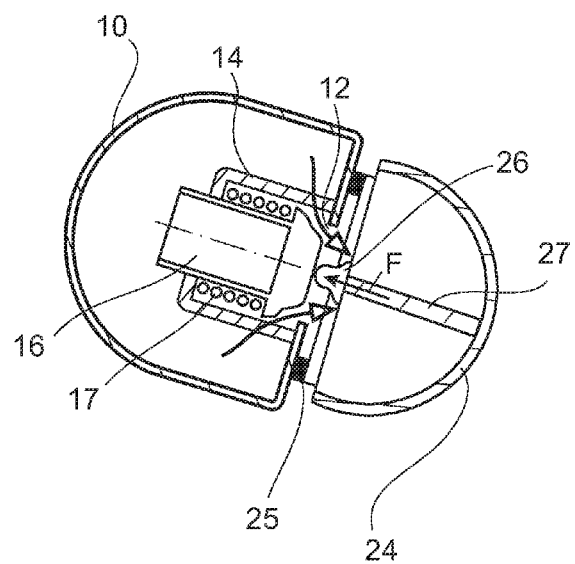
FIG. 7 is a sectional view of a check valve together with an air tap opening.

FIG. 7 presents a view intended to illustrate the interaction between an air tap opening 24 and check valve 14. The air tap opening 24 is arranged in such a way relative to the valve 14 on an air supply line 10 that the rib 26 supported by braces 27 exerts a force F on the plunger 16 of the check valve 14, and presses the plunger back against the restoring force of the spring 17. In this way, the air outlet 12 is opened, and air can flow out of the air supply line 10 (as symbolized by the two arrows).

Figure 8:
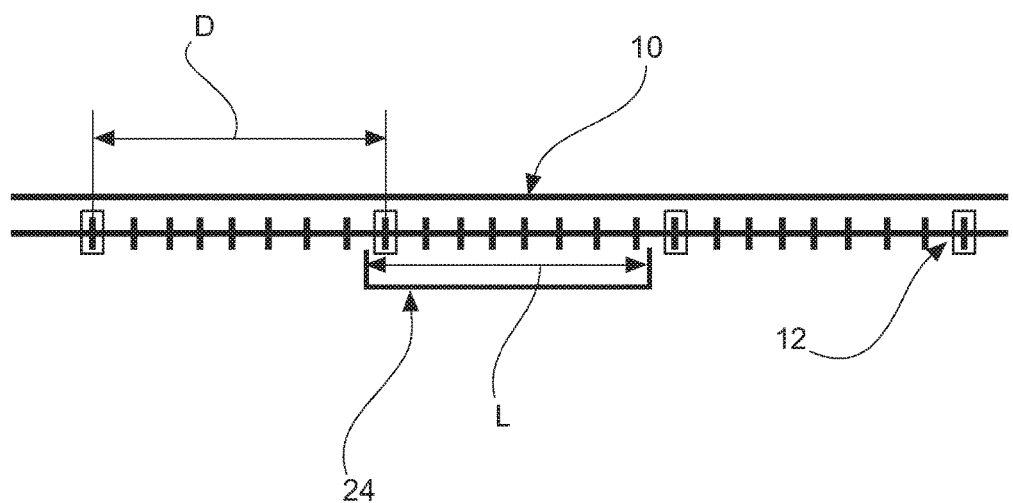
FIG. 8 shows a motion grid for an individual air panel on an air supply line.

FIG. 8 presents a diagrammatic view of a motion grid for a PSU with an air tap opening 24 relative to an air supply line 10. Spaced apart by distance D from each other in the air supply line are air outlets 12, wherein these air outlets 12 can each be sealed, for example with a check valve. The distance D is greater than the length L of the air tap opening, so that only one air outlet 12 is covered by the air tap opening at any one time. For example, if the distance D measures about 14 inches (35.5 cm) and the length L about 12 inches (30.5 cm), it can be ensured after at least about every 2 inches (5 cm) that the air tap opening covers an air outlet 12, and opens a valve in the air outlet, for example by means of a rib.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An air supply system for passengers, comprising:
an air supply line with a plurality of laterally situated air outlets, which are spaced apart at uniform distances from each other; and
an individual air panel with at least one air nozzle and one air tap opening which comprises a width and length;
wherein the length of the air tap opening is several times greater than the width of the air tap opening and the air tap opening is greater than one of the air outlets of the air supply line, the individual air panel is variably positioned in the longitudinal direction on the air supply line in such a way that the air tap opening in the longitudinal direction is arranged parallel to the air supply line, and the air tap opening covers the one of the air outlets, so that air flows out of the air supply line through the air outlet and the air tap opening to the at least one air nozzle;
wherein each of the air outlets includes a valve, an actuating element for opening the valve is arranged on the air tap opening and the actuating element opens the valve when the individual air panel is positioned on the air supply line; and
wherein the valve is a check valve, the check valve is situated in a respective one of the air outlets in such a way that a plunger of the check valve is outwardly directed, and the actuating element is suitable for inwardly pressing the plunger, and thereby opening the check valve.

2. The air supply system according to claim 1, further comprising an attachment rail, wherein the individual air panel is secured to the attachment rail in such a way that it is shiftable along the air supply line.

3. The air supply system according to claim 2, wherein the actuating element is suitable for opening an air outlet when the air tap opening is shifted over the air outlet.

4. The air supply system according to claim 3, wherein the distance between two air outlets is slightly greater than the length of the air tap opening.

5. The air supply system according to claim 4, further comprising a plurality of individual air panels, wherein the individual air panels are positionable on the air supply line at one of several predetermined positions spaced apart at uniform distances from each other along the air supply line, and the positions are predetermined in such a way that the air tap opening always completely covers precisely one air outlet.

6. The air supply system according to claim 1, wherein the individual air panel further comprises at least one element selected from the group comprising a reading lamp, stewardess call button, loudspeaker, USB interface, optical display element, oxygen mask and oxygen generator.

7. The air supply system according to claim 1, further comprising an air treatment unit.

8. An aircraft, comprising:
a passenger cabin;
an air supply system for supplying passengers in the passenger cabin with individual inlet air, the air supply system including:
an air supply line with a plurality of laterally situated air outlets, which are spaced apart at uniform distances from each other; and
an individual air panel with at least one air nozzle and one air tap opening, which comprises a width and length, each of the plurality of laterally situated air outlets including a valve and the air tap opening including an actuating element that opens the valve when the individual air panel is positioned on the air supply line,
wherein the length of the air tap opening is several times greater than the width of the air tap opening, the individual air panel is variably positioned in the longitudinal direction on the air supply line in such a way that the air tap opening in the longitudinal direction is arranged parallel to the air supply line, and the air tap opening covers one of the air outlets, so that air can flow out of the air supply line through the air outlet and air tap opening to the at least one air nozzle; and
wherein the valve is a check valve, the check valve is situated in a respective one of the air outlets in such a way that a plunger of the check valve is outwardly directed, and the actuating element is suitable for inwardly pressing the plunger, and thereby opening the check valve.

9. The aircraft according to claim 8, further comprising an attachment rail, wherein the individual air panel is secured to the attachment rail in such a way that it is shiftable along the air supply line.

10. The aircraft according to claim 9, wherein the actuating element is suitable for opening the respective one of the air outlets when the air tap opening is shifted over the respective one of the air outlets.

11. The aircraft according to claim 10, wherein the distance between two air outlets is slightly greater than the length of the at least one air tap opening.

12. The aircraft according to claim 11, further comprising a plurality of individual air panels, wherein the individual air panels are positionable on the air supply line at one of several predetermined positions spaced apart at uniform distances from each other along the air supply line, and the positions are predetermined in such a way that the air tap opening always completely covers precisely one of the air outlets.

13. The aircraft according to claim 8, wherein the individual air panel further comprises at least one element selected from the group comprising a reading lamp, stewardess call button, loudspeaker, USB interface, optical display element, oxygen mask and oxygen generator.

14. The aircraft according to claim 8, further comprising an air treatment unit.

\* \* \* \* \*